(12) United States Patent
Abe

(10) Patent No.: US 7,845,367 B2
(45) Date of Patent: Dec. 7, 2010

(54) LOCK DEVICE FOR OPERATION PATTERN SELECTING VALVE

(75) Inventor: Shinya Abe, Kasumigaura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 358 days.

(21) Appl. No.: 11/828,914

(22) Filed: Jul. 26, 2007

(65) Prior Publication Data

US 2008/0022733 A1 Jan. 31, 2008

(30) Foreign Application Priority Data

Jul. 28, 2006 (JP) ............................. 2006-207225

(51) Int. Cl.
*F16K 35/06* (2006.01)

(52) U.S. Cl. .................. 137/385; 137/383; 70/175; 70/177; 70/180

(58) Field of Classification Search .......... 137/377, 137/382, 383, 385; 70/175, 176, 180, 177, 70/178, 179
See application file for complete search history.

(56) References Cited

U.S. PATENT DOCUMENTS

| 3,960,168 | A | * | 6/1976 | Plympton | 137/385 |
| 3,976,095 | A | * | 8/1976 | Koch et al. | 137/385 |
| 4,162,690 | A | * | 7/1979 | Anderson | 137/385 |
| 4,498,320 | A | * | 2/1985 | Mullis | 70/177 |
| 4,513,773 | A | * | 4/1985 | Hardiman, Jr. | 137/382 |
| 4,534,379 | A | * | 8/1985 | Burge | 137/385 |
| 4,909,275 | A | * | 3/1990 | Massey et al. | 137/385 |
| 5,143,114 | A | * | 9/1992 | Daniels | 137/385 |
| 5,579,804 | A | * | 12/1996 | Roberts | 137/385 |
| 2004/0226611 | A1 | * | 11/2004 | Berger et al. | 137/385 |

FOREIGN PATENT DOCUMENTS

| JP | 5-47660 | * | 6/1993 |
| JP | 5-49858 | | 7/1993 |
| JP | 05049858 U | * | 7/1993 |

* cited by examiner

*Primary Examiner*—John Rivell
*Assistant Examiner*—Kevin Murphy
(74) *Attorney, Agent, or Firm*—Mattingly & Malur, P.C.

(57) ABSTRACT

A lock device includes a first bracket 34 fixed to a screw element 33 and formed with a lock hole 34b; a second bracket 35 which has a fitting portion 35a fitted to the turn-type control lever 30 of an operation pattern selecting valve 16 and which is formed with a lock hole 35f; and a lock 36. The screw element 33 is screwed into a threaded hole 32 formed in an end plate 29 of the operation pattern selecting valve 16 to secure the first bracket 34 to the end plate 29. The fitting portion 35a of the second bracket 35 is fitted to the turn-type control lever 30 to connect the second bracket 35 to the turn-type control lever 30. The lock 36 is insertably attached to the respective lock holes 34b and 35f of the first bracket 34 and second bracket 35 for locking the turn-type control lever 30. With such a structure, the lock device can be manufactured relatively easily without the necessity of processing the operation pattern selecting valve.

3 Claims, 13 Drawing Sheets

LOCK DEVICE FOR OPERATION PATTERN SELECTING VALVE

BACKGROUND OF THE INVENTION

1. Field of the Invention

The present invention generally relates to an operation pattern selecting valve for enabling an operator to operate the tilt-type control levers on both sides of an operator's seat in an operation pattern conforming to the experience of the operator in view of the fact that in a working machine installed with a multi-joint front on an upper swing structure like a hydraulic excavator or an application machine thereof, which one of the tilt-type control levers is used to operate hydraulic cylinders for operating the multi-joint front and a hydraulic motor for a swing device in desired directions is different between manufactures or between a manufacture and the International Standard. More particularly, the present invention relates to a lock device for locking the operation pattern selecting valve so that the selected operation pattern cannot be changed by someone to enhance safety.

2. Description of the Related Art

Hydraulic excavators and various working machines constructed by applying their basic configurations thereto include a lower travel structure, an upper swing structure installed on the lower travel structure via a swing device, and a multi-joint front having a boom attached to the upper swing structure, an arm attached to the end of the boom, an operating tool such as a bucket attached to the end of the arm, and hydraulic cylinders for raising and lowering and swinging them. Tilt-type control levers for pilot valves for operating a hydraulic motor for swinging the swing device and for pilot valves for operating hydraulic cylinders of the multi-joint front are usually installed on the left and right sides in the front of the operator's seat as disclosed JP-U-5-47660 and JP-U-5-49858.

Each of such a control lever is operated forward, backward, leftward and rightward from a position where it is centrally raised, i.e., where the related actuators are stopped. For one manufacturer, forward and rearward operations of the right control lever correspond respectively to lowering and raising of the boom, and leftward and rightward operations of the right control lever correspond respectively to bucket-crowding (excavation) and bucket-dumping. Forward and rearward operations of the left control lever correspond respectively to rightward swing and leftward swing, and leftward and rightward operations correspond respectively to arm-raising and arm-lowering.

However, for a working machine of another manufacture, forward and rearward operations of the left control lever correspond respectively to arm-lowering and arm-raising and leftward and rightward operations correspond respectively to leftward-swing and rightward-swing.

As described above, the operation pattern of the control lever is different between manufactures or between a manufacturer and the International Standard. That is to say, which one of the left and right control levers is operated or which one of directions of forward and backward directions and leftward and rightward directions is selected by operating the control lever is different between manufactures or between a manufacturer and the International Standard. In such a case, if an operator who has been accustomed to operating a working machine of a manufacture operates another working machine of another manufacture, it becomes difficult for he or she to operate it and erroneous operation is likely to occur. For this reason, when a new working machine is used for operation, the operation pattern of a control lever is made to conform to an operation pattern to which an operator has been accustomed. In order to make the operation pattern selectable as described above, an operation pattern selecting valve is provided between pilot valves actuated by the control lever and the associated operating hydraulic fluid chambers of a control valve to switch hydraulic fluid passage.

The operation pattern selecting valve described in JP-U-5-47660 is configured such that an turn-type spool is fitted to the inside of a cylindrical body having ports connected to respective hydraulic lines. A shaft is secured to an end of this spool so as to project from a central hole of an end plate and a turn-type control lever is attached to the shaft so as to extend in a radial direction. Turning this control lever allows a port formed in the cylindrical body to communicate with another port and to be interrupted from the other ports.

If, after the turn-type control lever has been set to provide an operation pattern, this setting is changed by someone such as another operator, such an operation pattern selecting valve is likely to cause erroneous operation when operated by an operator who usually uses the operation pattern. To prevent such erroneous operation, JP-U-5-47660 and JP-U-5-49858 propose that the turn-type control lever is locked at a fixation position so that the operation pattern is not easily changed by someone.

The lock device described in JP-U-5-47660 is configured as below by way of example. A lock plate formed with a lock hole is attached to a bracket so as to be able to be raised and laid, the bracket being welded to a turn-type control lever. On the other hand, the head of a wing screw that secures the turn-type control lever to an end plate is formed with a lock hole. A lock is insertably attached to the lock holes of the lock plate and the wind screw for locking the turn-type control lever. In addition, another example is disclosed in which brackets formed with lock holes are attached to the turn-type control lever and a case and are locked by a lock for joint. In JP-U-5-49858, a turn-type control lever and a wing screw insertably attached to the control lever are formed with respective holes in a radial direction, into which a wire-type lock is inserted for attachment.

SUMMARY OF THE INVENTION

The lock devices described in JP-U-5-47660 and JP-U-5-49858 have a problem in which the operation pattern selecting valve needs a process, such as welding a bracket or providing a hole for attachment of a lock plate thereto, which provides difficult manufacture. In particular, the operation pattern selecting valve is manufactured by a manufacturer specializing in valve in actuality. Thus, difficulty in manufacture increases for working machine manufacturers.

In view of the foregoing problem, it is an object of the invention to provide a lock device for an operation pattern selecting valve that can be manufactured relatively easily without the necessity of processing the operation pattern selecting valve.

According to a first aspect of the present invention, there is provided a lock device for an operation pattern selecting valve in a working machine including: a plurality of hydraulic actuators for actuating a multi-joint front of the working machine and a swing device for swinging an upper swing structure; a plurality of hydraulically operated control valves for controlling said hydraulic actuators, and pilot valves for operating the control valves; tilt-type control levers installed on the left and right of an operator's seat and each serving as a control lever for the pilot valves, each of the tilt-type control lever being tilted forward, rearward, leftward and rightward; and an operation pattern selecting valve interposed in lines between operating hydraulic fluid chambers of each of the hydraulically operated control valves and the pilot valves for supplying pilot hydraulic fluid to the associated operating hydraulic fluid chambers, for selecting the hydraulic actuators actuated by each of the tilt-type control levers and/or selecting an operating direction of each of the hydraulic actuators for the operating direction of each of the tilt-type control levers, the operation pattern selecting valve being configured such that an end plate is attached to an end face of a cylindrical body in which a turn-type spool is housed and a turn-type control lever is attached to a shaft of the turn-type spool so as to project from the end plate in a radial direction of the shaft; the lock device comprising: a first bracket fixed to a screw element or formed integrally therewith screwed into a threaded hole formed in the end plate, said first bracket being formed with a first lock hole; a second bracket having a fitting portion fitted to the turn-type control lever, said second bracket being formed with a second lock hole; and a lock; wherein the screw element is screwed into the threaded hole to secure said first bracket to the end plate, the fitting portion of said second bracket is fitted to the turn-type control lever to connect said second bracket to the turn-type control lever, and said lock is insertably attached to the first and second lock holes of said first and second brackets for locking the turn-type control lever.

Preferably, the second bracket has a stopper which abuts against a tip of the turn-type control lever thereby to prevent the turn-type control lever from dropping out of the shaft of the turn-type spool.

According to a second aspect of the present invention, there is provided a lock device for an operation pattern selecting valve in a working machine including: a plurality of hydraulic actuators for actuating a multi-joint front of the working machine and a swing device for swinging an upper swing structure; a plurality of hydraulically operated control valves for controlling said hydraulic actuators, and pilot valves for operating the control valves; tilt-type control levers installed on the left and right of an operator's seat and each serving as a control lever for the pilot valves, each of the tilt-type control lever being tilted forward, rearward, leftward and rightward; and an operation pattern selecting valve interposed in lines between operating hydraulic fluid chambers of each of the hydraulically operated control valves and the pilot valves for supplying pilot hydraulic fluid to the associated operating hydraulic fluid chambers, for selecting the hydraulic actuators actuated by each of the tilt-type control levers and/or selecting an operating direction of each of the hydraulic actuators for the operating direction of each of the tilt-type control levers, the operation pattern selecting valve being configured such that an end plate is attached to an end face of a cylindrical body in which a turn-type spool is housed and a turn-type control lever is attached to a shaft of the turn-type spool so as to project from the end plate in a radial direction of the shaft; the lock device comprising: a screw element for securing the turn-type control lever; a first bracket formed with an attachment hole and a first lock hole; a second bracket having a structure to be assembled with said first bracket and formed with a second lock hole; and a lock; wherein said screw element is inserted into the attachment hole of said first bracket and a hole formed in the turn-type control lever and screwed into a threaded hole formed in the end plate thereby to secure said first bracket to the turn-type control lever, and said second bracket is assembled with said first bracket to cover a head of said screw element and the first lock hole of said first bracket is aligned with the second lock hole of said second bracket and said lock is insertably attached to the first and second lock holes for locking the turn-type control lever.

In the first aspect of the present invention, the turn-type control lever cannot turned for removal except by unlocking the lock which joins the first and second brackets together; therefore, the operation pattern is unlikely to be changed by someone. In general, the threaded hole formed in the end plate of the operation pattern selecting valve is essentially provided to secure the turn-type control valve. The first and second brackets in the present invention are provided separately from the operation pattern selecting valve. Thus, the operation pattern selecting valve does not need operation such as welding of the bracket and drilling, thereby facilitating the manufacture.

Further, in the first aspect of the present invention, the turn-type control lever does not need to be provided with a screw insertion hole used to secure the control lever to the end plate. Therefore, the lock device of the present invention can be applied to a small-sized operation pattern selecting valve with a thin turn-type control lever.

If the turn-type control lever is insertably attached to or is screwed into a hole of a shaft included in the turn-type spool, the stopper prevents the turn-type control lever from dropping out, which further enhances safety.

In the second aspect of the present invention, the head of the screw element is covered by the second bracket so that the screw element cannot be removed except by unlocking. Therefore, the operation pattern is unlikely to be changed by someone. This invention is applied to the case where the turn-type operation lever is formed with a hole. The screw element insertably attached to the hole is used to secure the first bracket, and the second bracket is assembled with the first bracket for locking. Thus, the operation pattern selecting valve does not need operation such as welding of the bracket and drilling, thereby facilitating the manufacture.

Figure 1:
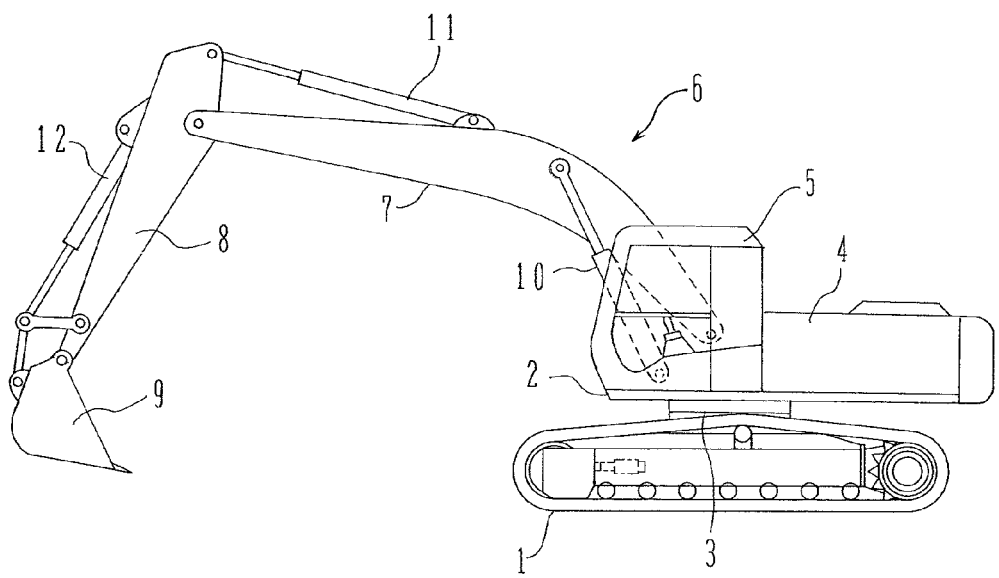
FIG. 1 is a lateral view illustrating a hydraulic excavator which is a working machine to which the present invention is applied by way of example.

Reference numerals will briefly be described as below.

1: lower travel structure, 2: upper swing structure, 3: swing device, 4: hydraulic power unit, 5: cabin, 6: multi-joint front, 7: boom, 8: arm, 9: bucket, 10-12: hydraulic cylinder, 13, 14: tilt-type control lever, 15: operator's seat, 16: operation pattern selecting valve, 20: pilot pump, 21, 23: control valve, 22: hydraulic motor of the swing device, 24: port, 25: cylindrical body, 26: turn-type spool, 27: shaft, 29: end plate, 30: turn-type control lever, 31: hydraulic fluid passage, 32: threaded hole, 33: screw element, 34: first bracket, 34a: joint piece, 34b: lock hole, 35: second bracket, 35a: fitting portion, 35b: joint piece, 35c: stopper, 35d, 35e: attachment hole, 35f: lock hole, 36: lock, 37: locking pin, 40: operation pattern selecting valve, 41: screw element, 41a: head, 42: first bracket, 42a: flat plate portion, 42b: attachment hole, 42c: locking piece, 42d: rise portion, 42e: joint piece, 42f: lock hole, 43: second bracket, 43a: flat plate portion, 43b: lateral plate portion, 43c: longitudinal plate portion, 43d: uplift prevention piece, 43e: joint piece, 43f: lock hole.

DETAILED DESCRIPTION OF THE PREFERRED EMBODIMENTS

FIG. 1 illustrates a working machine to which the present invention is applied, the working machine being a hydraulic excavator by way of example. In the figure, there are shown a lower travel structure 1, an upper swing structure 2 which is installed on the lower travel structure 1 via a swing device 3 and on which a hydraulic power unit 4, a cab 5, etc, are mounted, and a multi-joint front 6 mounted on the upper swing structure 2. This front 6 includes a boom 7, an arm 8, a bucket 9, a hydraulic cylinder 10 for raising and lowering the boom, an arm-swing hydraulic cylinder 11 and a bucket-swing hydraulic cylinder 12.

Figure 2A:
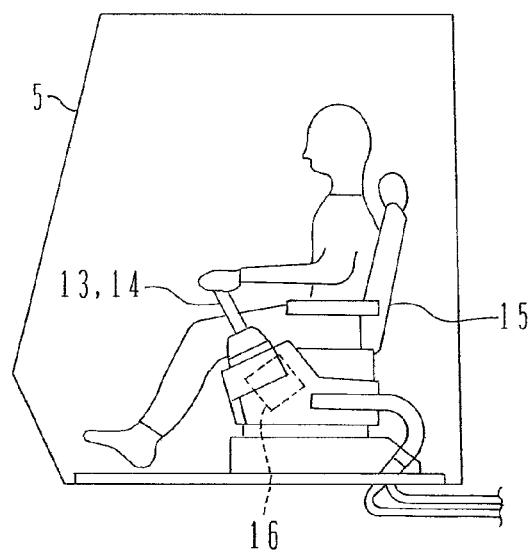
FIG. 2A is a lateral view illustrating a tilt-type control lever in a cabin of the working machine in FIG. 1.
Figure 2B:
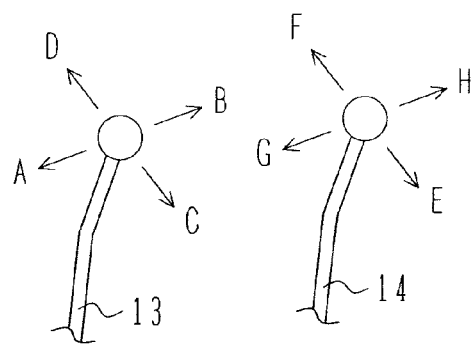
FIG. 2B illustrates the operating directions of the respective tilt-type control levers provided on the left and right of the front of the operator's seat.

Referring to FIGS. 2A and 2B, tilt-type control levers 13, 14 which are tilted forward, backward, leftward and rightward for operation are installed on the left side and right side of the front of an operator's seat 15 in the cabin 5. Such control levers 13, 14 are control levers for pilot valves for operating control valves adapted to control swing-purpose hydraulic motor and hydraulic cylinders 10, 11, 12 of the swing device 3. Reference numeral 16 denotes an operation pattern selecting valve adapted to select which one of the control levers 13, 14 or which one of operating directions for operating the swing hydraulic motor and hydraulic cylinders 10, 11, 12 of the swing device 3. In this embodiment, the operation pattern selecting valve 16 is installed below the left side tilt-type control lever 13. Incidentally, the installation position of the operation pattern selecting valve 16 is not limited to this example but may be installed in a mechanical room of the upper swing structure 2.

Figure 3:
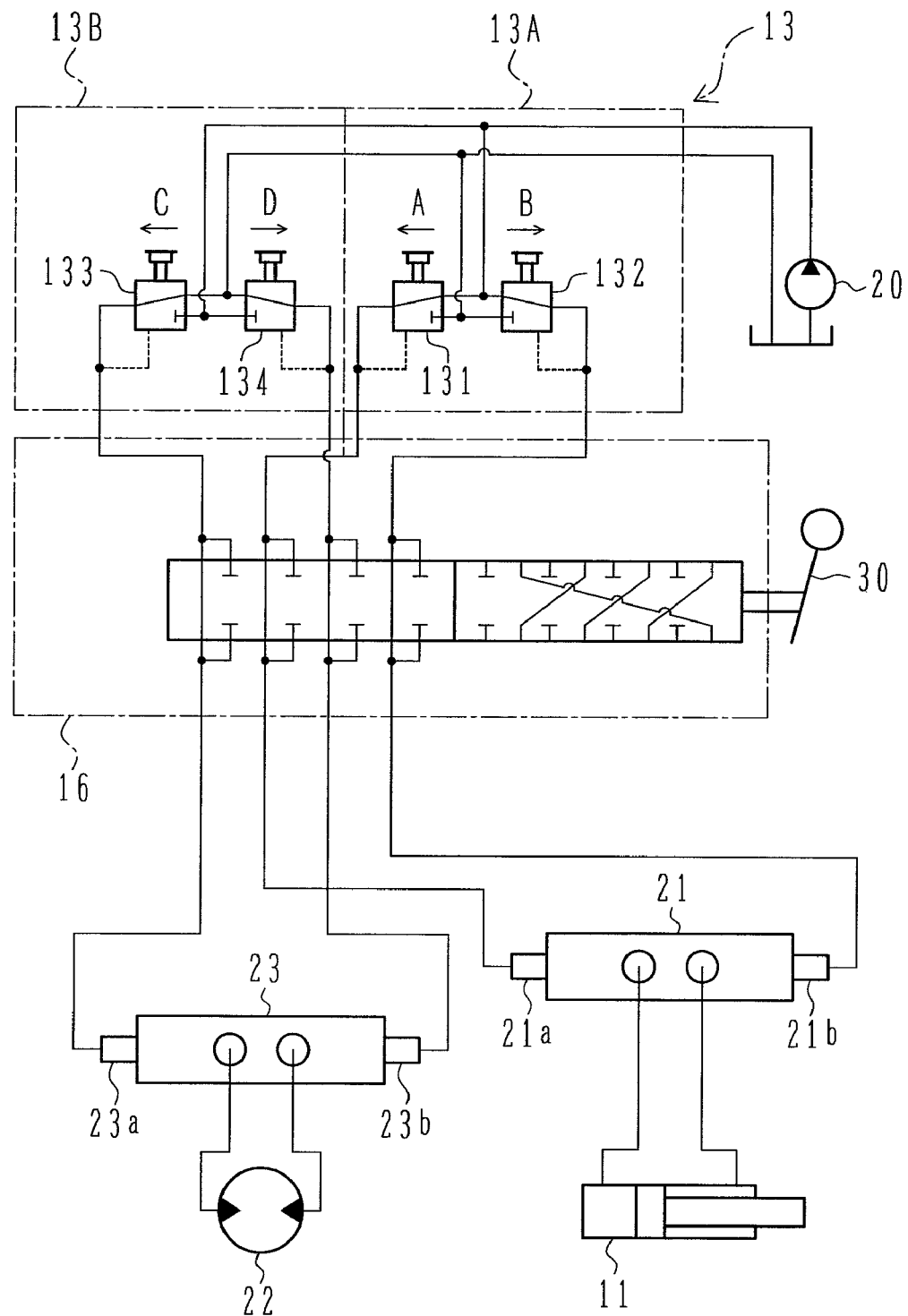
FIG. 3 is a hydraulic circuit diagram illustrating a hydraulic circuit including an operation pattern selecting valve to which the present invention is applied by way of example.

FIG. 3 is a hydraulic circuit diagram illustrating how the operation pattern selecting valve 16 embodying the present invention is arranged on a hydraulic circuit. In the figure, there are shown a pilot pump 20 included in the hydraulic power unit 4, pilot valves 13A and another pilot valves 13B. Of the pilot valves actuated by the control lever 13 the pilot valves 13A is actuated when the control lever is operated leftward and rightward and the pilot valves 13B is actuated when the control lever is operated forward and rearward. In addition, the pilot valves 13A includes two pilot valves, i.e., a first valve 131 and a second valve 132, and similarly the pilot valves 13B includes two pilot valves, i.e., a first valve 133 and a second valve 134.

Reference numeral 21 denotes a control valve for the arm-swing hydraulic cylinder 11, 22 denotes a swing-purpose hydraulic motor of the swing device 3 and 23 denotes a control valve for the swing hydraulic motor. Reference numerals 21a, 21b denote operating hydraulic fluid chambers for the control valve 21 and 23a, 23b denotes operating hydraulic fluid chambers for the control valve 23.

In FIG. 2B, arrows A and B denote leftward and rightward tilting operations, respectively, of the left-hand control lever 13 and arrows C and D denotes rearward and forward tilting operations, respectively, of the left-hand control lever 13. In addition, arrows E and F denote rearward and forward tilting operations, respectively, of the right-hand control lever 14 and arrows G and H denotes leftward and rightward tilting operations, respectively, of the right-hand control lever 14.

In the case where the operation pattern selecting valve 16 in the circuit of FIG. 3 is actuated to the leftward position in the figure in the present embodiment, if the tilt-type control levers 13 and 14 are operated in the operating directions A through H of FIG. 2B, the corresponding actuators are actuated as follows: A: arm up, B: arm down, C: swing leftward, D: swing rightward, E: boom up, F: boom down, G: bucket excavation, and H: bucket dumping. These actuations are explained with reference to the hydraulic circuit diagram of FIG. 3. If the control lever 13 is operated to tilt leftward A, the first valve 131 of the pilot valves 13A is actuated so that pilot hydraulic fluid from the pilot pump 20 is supplied through the first valve 131 and operation pattern selecting valve 16 to the operating hydraulic fluid chamber 21a of the control valve 21, which contracts the arm-swing hydraulic cylinder 11, thereby raising the arm 6. Similarly, if the control lever 13 is operated to tilt rightward B, the second valve 132 of the pilot valves 13A is actuated so that pilot hydraulic fluid from the pilot pump 20 is supplied through the second valve 132 and operation pattern selecting valve 16 to the operating hydraulic fluid chamber 21b of the control valve 21, which contracts the arm-swing hydraulic cylinder 11, thereby lowering the arm 6.

If the control lever 13 is operated to tilt backward C, the first valve 133 of the pilot valves 13B is actuated so that pilot hydraulic fluid from the pilot pump 20 is supplied through the first valve 133 and operation pattern selecting valve 16 to the operating hydraulic fluid chamber 23a of the control valve 23, which actuates the hydraulic motor 22 of the swing device 3 in the leftward swing direction, thereby swinging the upper swing structure 2 leftward. Similarly, if the control lever 13 is operated to tilt forward D, the second valve 134 of the pilot valves 13B is actuated so that pilot hydraulic fluid from the pilot pump 20 is supplied through the second valve 134 and operation pattern selecting valve 16 to the operating hydraulic fluid chamber 23b of the control valve 23, which actuates the hydraulic motor 22 of the swing device 3 in the rightward swing direction, thereby swinging the upper swing structure 2 rightward.

On the other hand, in the case where the operation pattern selecting valve 16 is switched to the rightward position in FIG. 3, if the control levers 13 and 14 are operated in the operating directions A through H of FIG. 2B, the corresponding actuators are actuated as follows: A: swing leftward, B: swing rightward, C: arm up, D: arm down, E: boom up, F: boom down, G: bucket excavation, and H: bucket dumping.

These actuations are explained with reference to the hydraulic circuit diagram of FIG. 3. If the control lever 13 is operated to tilt leftward A, the first valve 131 of the pilot valves 13A is actuated so that pilot hydraulic fluid from the pilot pump 20 is supplied through the first valve 131 and operation pattern selecting valve 16 to the operating hydraulic fluid chamber 23a of the control valve 23, which actuates the swing-purpose hydraulic motor 22 in the leftward swing direction, thereby swinging the upper swing structure 2 leftward. Similarly, if the control lever 13 is operated to tilt rightward B, the second valve 132 of the pilot valves 13A is actuated so that pilot hydraulic fluid from the pilot pump 20 is supplied through the second valve 132 and operation pattern selecting valve 16 to the operating hydraulic fluid chamber 23b of the control valve 23, which actuates the swing-purpose hydraulic motor 22 in the rightward swing direction, thereby swinging the upper swing structure 2 rightward.

If the control lever 13 is operated to tilt rearward C, the first valve 133 of the pilot valves 13B is actuated so that pilot hydraulic fluid from the pilot pump 20 is supplied through the first valve 133 and operation pattern selecting valve 16 to the operating hydraulic fluid chamber 21b of the control valve 21, which expands the arm-swing hydraulic cylinder 11, thereby lowering the arm 6. Similarly, if the control lever 13 is operated to tilt forward D, the second valve 134 of the pilot valves 13B is actuated so that pilot hydraulic fluid from the pilot pump 20 is supplied through the second valve 134 and operation pattern selecting valve 16 to the operating hydraulic fluid chamber 21a of the control valve 21, which contracts the arm-swing hydraulic cylinder 11, thereby raising the arm 6.

Figure 4:
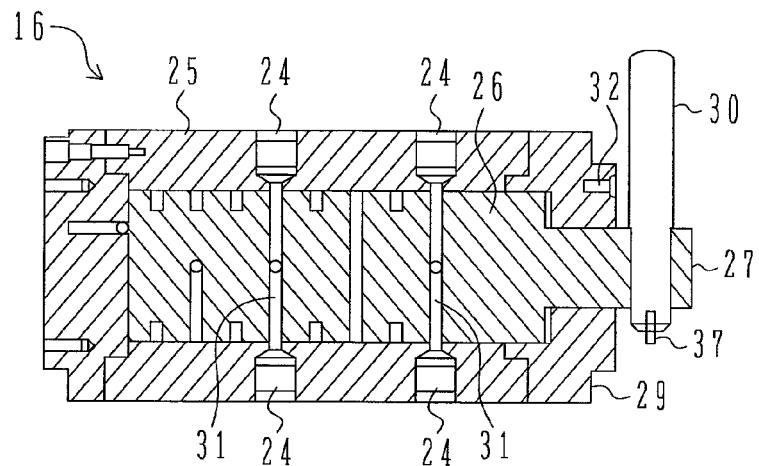
FIG. 4 is a cross-sectional view of the operation pattern selecting valve to which the present invention is applied by way of example.
Figure 5:
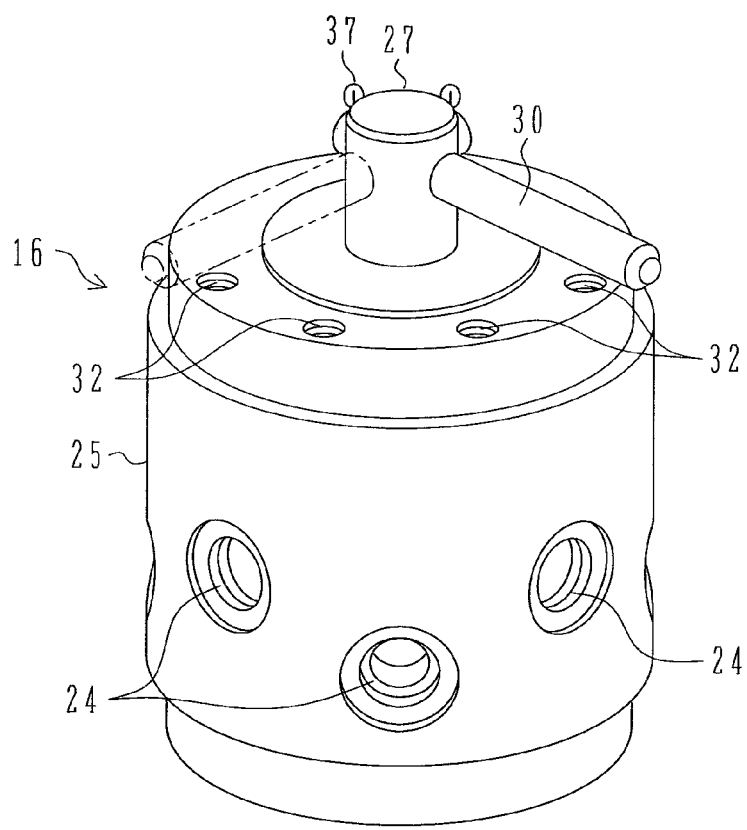
FIG. 5 is a perspective view of the operation pattern selecting valve to which the present invention is applied by way of example.

FIG. 4 is a cross-sectional view illustrating the structure of the operation pattern selecting valve 16, and FIG. 5 is a perspective view of the external appearance of the selecting valve 16. The operation pattern selecting valve 16 is configured such that a turn-type spool 26 is fitted into the inside of a cylindrical body 25 having ports 24 connected to corresponding hydraulic hoses, and a shaft 27 of the spool 26 is projected outward from a central hole of one of end plates. The proximal end of a turn-type control lever 30 is inserted into a hole bored in the shaft 27 and locked with a locking pin 37 so that the control lever 30 is oriented in the radial direction of the shaft 27. The control lever 30 is turned so that a port 24 formed in the cylindrical body 25 communicates with one of the other ports 24 through hydraulic fluid passage 31 in the spool 26 and the remaining ports are interrupted. The end plate 29 is formed with thread holes 32 spaced apart from each other. The control lever 30 is to be locked at a position between adjacent threaded holes 32.

Figure 6A:
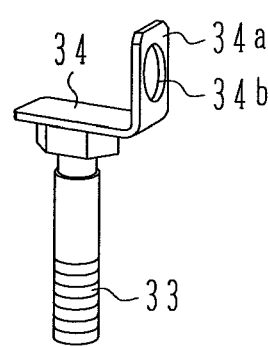
FIG. 6A is a perspective view of a first bracket constituting part of a lock device according to a first embodiment of the present invention.
Figure 6B:
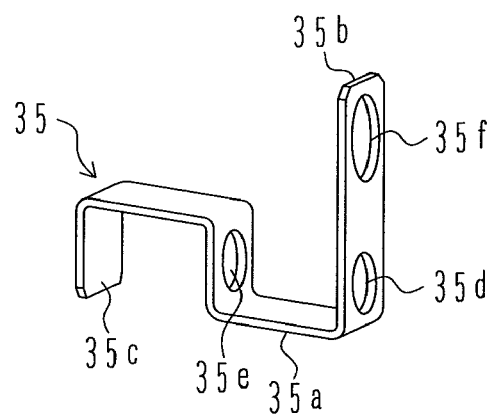
FIG. 6B is a perspective view of a second bracket constituting part of the lock device according to the first embodiment of the present invention.

FIGS. 6A and 6B illustrate brackets of the lock device according to a first embodiment of the present invention. FIG. 6A illustrates a screw element (including a bolt) 33 screwed into the threaded hole 32 and a first bracket 34 fixed to the screw element 33 by welding or the like. FIG. 6B illustrates a second bracket 35 attached to the control lever 30. The first bracket 34 is L-shaped, is fixed to the head of the screw element 33 by welding or the like, and is provided with a joint piece 34a projecting on a side opposite to the screw element 33. The joint piece 34a is used to be joined to the second bracket 35 and formed with a lock hole 34b.

The second bracket 35 is formed by punching and bending a metal plate so as to include a fitting portion 35a to be fitted to the control lever 30, a joint piece 35b to be joined to the first bracket 34 and a locking stopper 35c of the control lever 30. The fitting portion 35a is almost U-shaped to have parallel plate sections formed with respective attachment holes 35d, 35e. The joint piece 35b extends from an end of the fitting portion 35a and is formed with a lock hole 35f. The stopper 35c extends from the fitting portion 35a to be formed in an L-shape. Incidentally, the fitting portion 35a may be formed cylindrical or formed as a separate cylinder.

Figure 7:
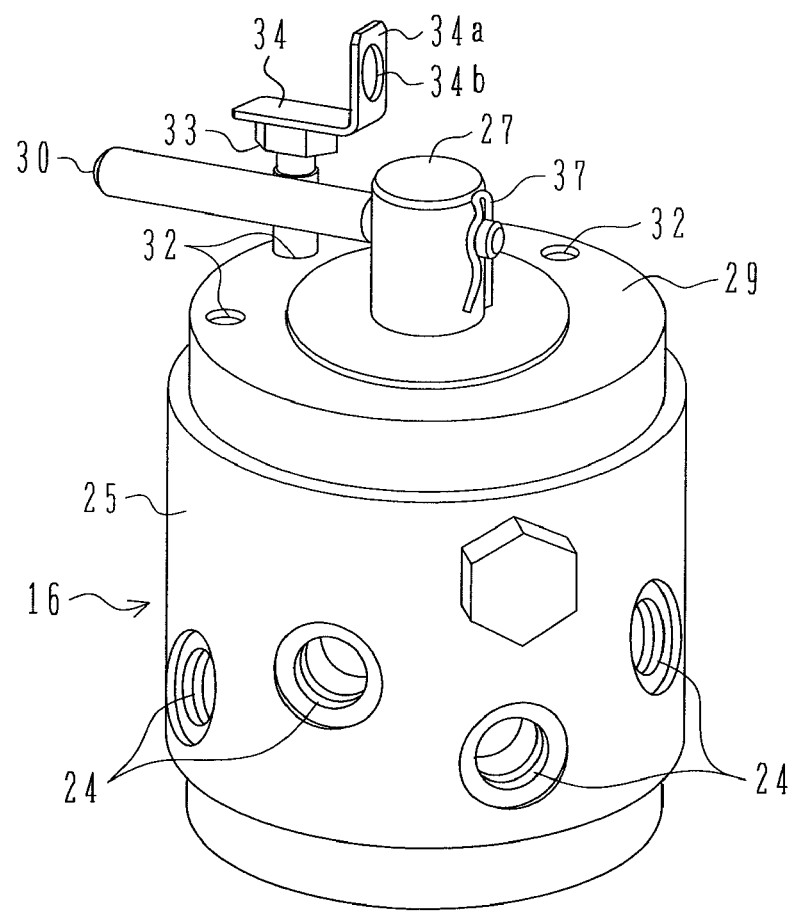
FIG. 7 is a perspective view illustrating a state where the first bracket is attached to an end plate of the operation pattern selecting valve in the first embodiment.
Figure 8:
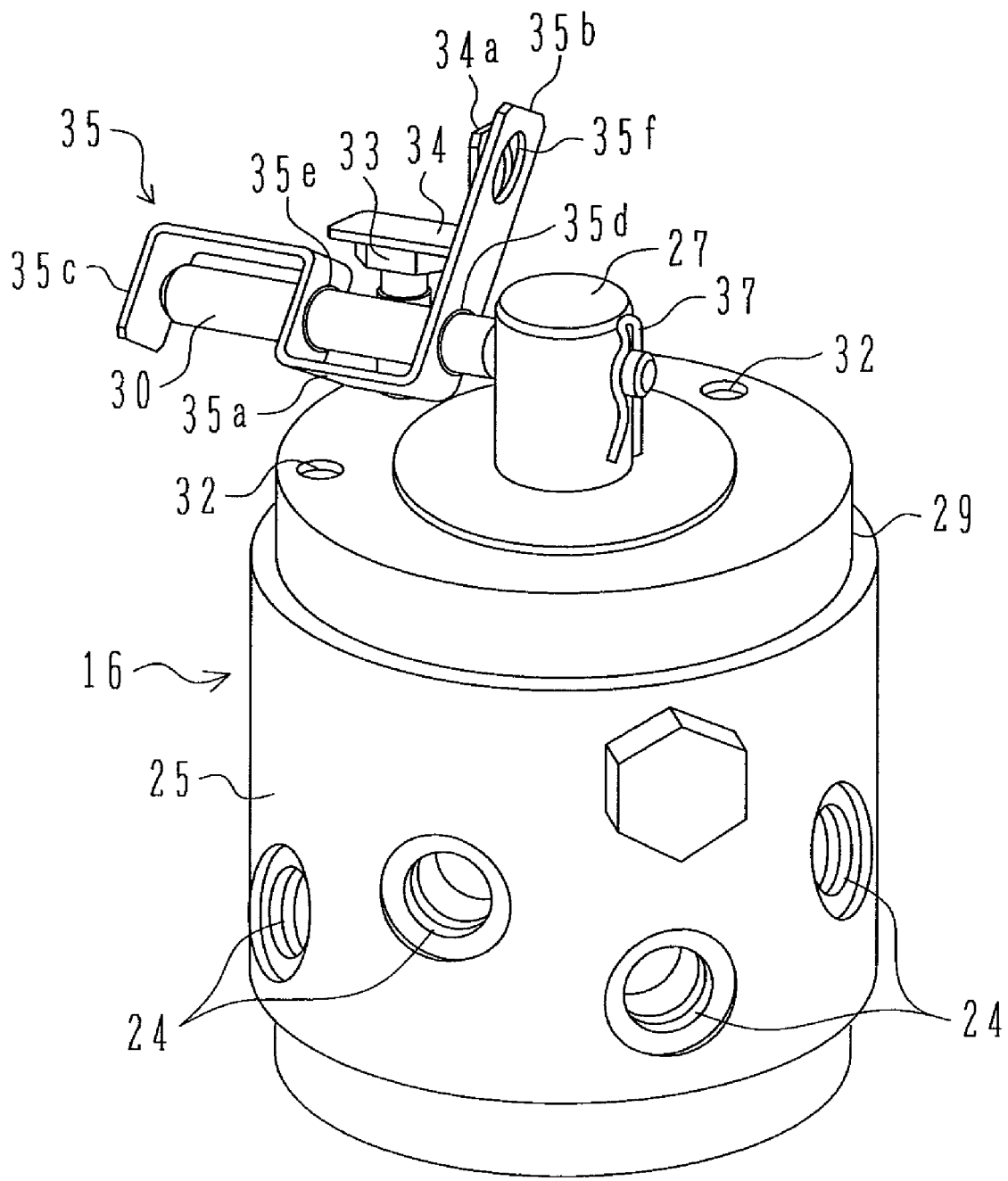
FIG. 8 is a perspective view illustrating a state where the second bracket is further attached to the turn-type control lever of a control pattern selecting valve additionally to the state shown in FIG. 7.
Figure 9:
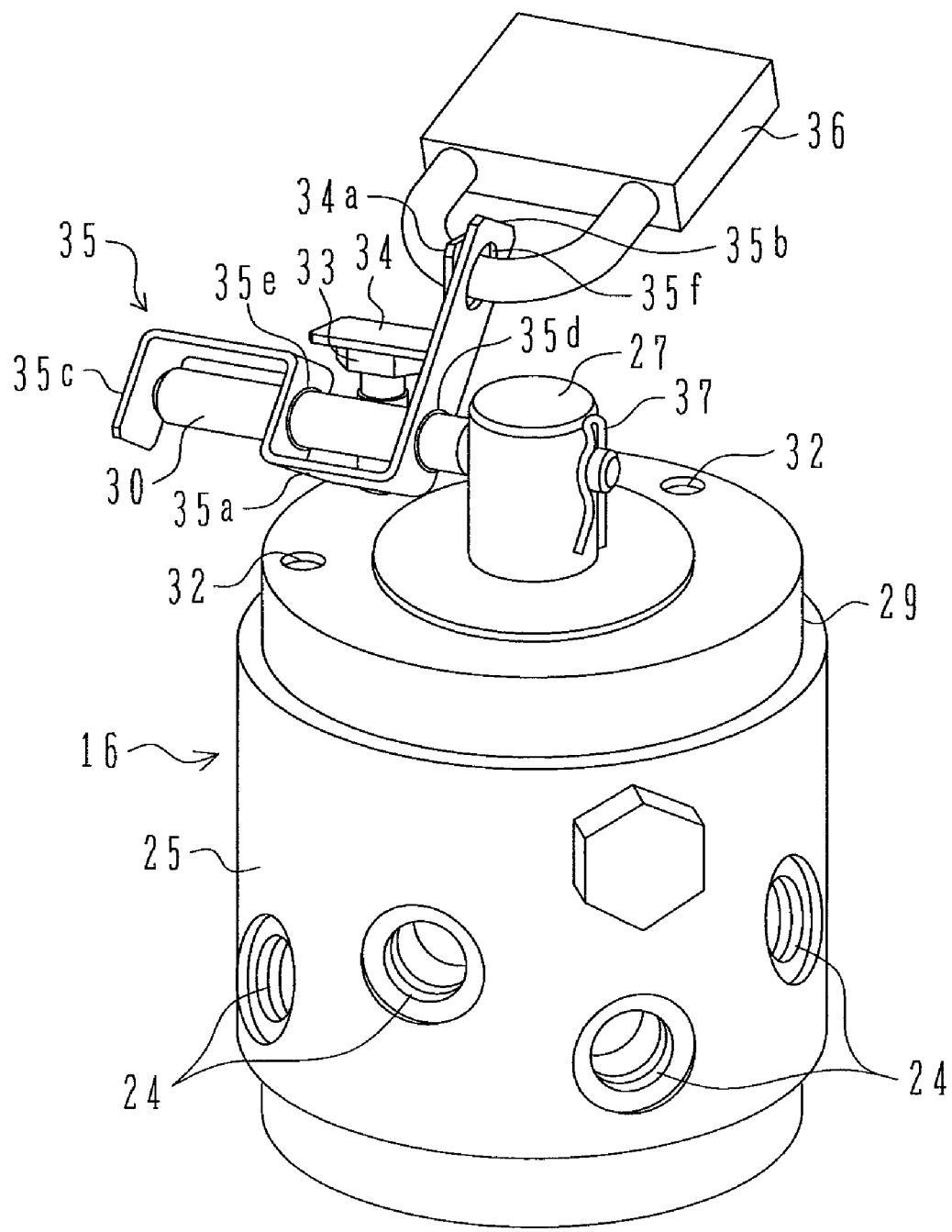
FIG. 9 is a perspective view illustrating a state where locking is performed additionally to the state shown in FIG. 8 in the first embodiment.

FIGS. 7 to 9 illustrate a process of locking operation. Referring to FIG. 7, the turn-type control lever 30 is first oriented in a direction to be locked, and then the screw element 33 fixed to the first bracket 34 is screwed into the threaded hole 32 adjacent to a position of the control lever 30. In this case, the turning degree of the first bracket 34 is adjusted so that the plate surface of the joint piece 34a of the first bracket 34 is almost perpendicular to the axial direction of the control lever 30.

Referring to FIG. 8, the second bracket 35 is next attached to the control lever 30 by fitting the attachment holes 35d, 35e to the control lever 30, and the joint piece 35b is superposed on the joint piece 34a of the first bracket 34 so that the lock holes 34b, 35f are aligned with each other. Referring to FIG. 9, a lock 36 is insertably attached to the lock holes 34b 35f for locking. In such a locking state, the control lever 30 cannot be turned unless a key is inserted into the lock 36 for unlock. The position of the control lever 30 cannot be changed by someone or by carelessness. Thus, the control lever 30 is unlikely to be turned by carelessness or by someone to causes the difficulty of the operation, and erroneous operation resulting from the control lever 30 turned is unlikely to occur.

In general, the threaded holes 32 are formed in the end plate 29 of the operation pattern selecting valve 16 to essentially secure the control lever 30, and the first and second brackets 34, 35 are provided separately from the operation pattern selecting valve 16. The operation pattern selecting valve 16 does not need operation such as welding of the bracket and drilling. Thus, the manufacture is facilitated.

The turn-type control lever 30 configured as in the embodiment does not need to provide a hole adapted to receive the screw element 33 inserted thereinto for fixation to the end plate 29. Therefore, the present embodiment can be applied to an operation pattern selecting valve with a thin small-sized control lever 30.

In the embodiment, the second bracket 35 is provided with the stopper 35c adapted to abut against the tip of the control lever 30. Therefore, even in the case where the control lever 30 is inserted into the hole of the shaft 27 for the turn-type spool 26 and fixed by the locking pin 37 or the like, or in the case where the control lever 30 is screwed for attachment, the control lever 30 is not withdrawn because of the stopper 35, which further enhances safety.

Figure 10:
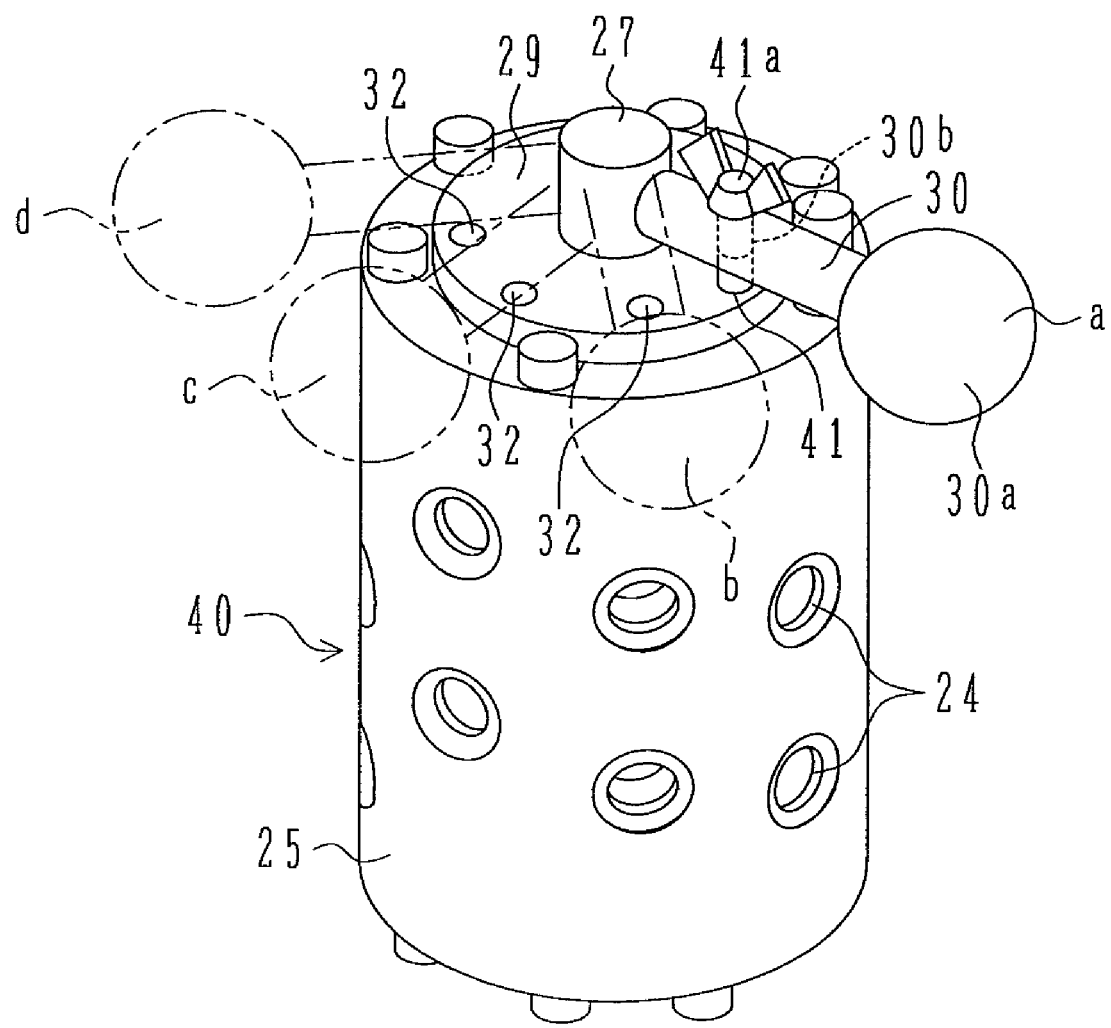
FIG. 10 is a perspective view illustrating an operation pattern selecting valve to which the present invention is applied by way of another example.

FIG. 10 illustrates a turn-type control lever as another example to which a lock device according to a second embodiment of the present invention is applied. This turn-type control lever 30 is a turn-type control lever applied to a case where the left and right tilt-type control levers 13, 14 are each operated in the same direction to actuate different targets.

In this case, the tilt-type control levers 13, 14 and operation patterns are selected for four hydraulic actuators (the hydraulic motor 22, hydraulic cylinders 10, 11, 12 of the swing device). Therefore, the cylindrical body 25 is provided with sixteen ports 24. This operation pattern selecting valve 40 is a four-position control valve having four switching positions (indicated with symbols "a", "b", "c" and "d"). The control lever 30 has a spherical grip portion 30a at its distal end and is formed with a hole 30b adapted to receive a screw element (including a bolt) 41 inserted thereinto for securing the control lever 30. An end plate 29 facing the turn-type control lever 30 is formed with the threaded holes 32 described above at respective positions (directly below the control lever 30 on the drawing) corresponding to the respective switching positions "a" "b" "c" and "d".

Figure 11:
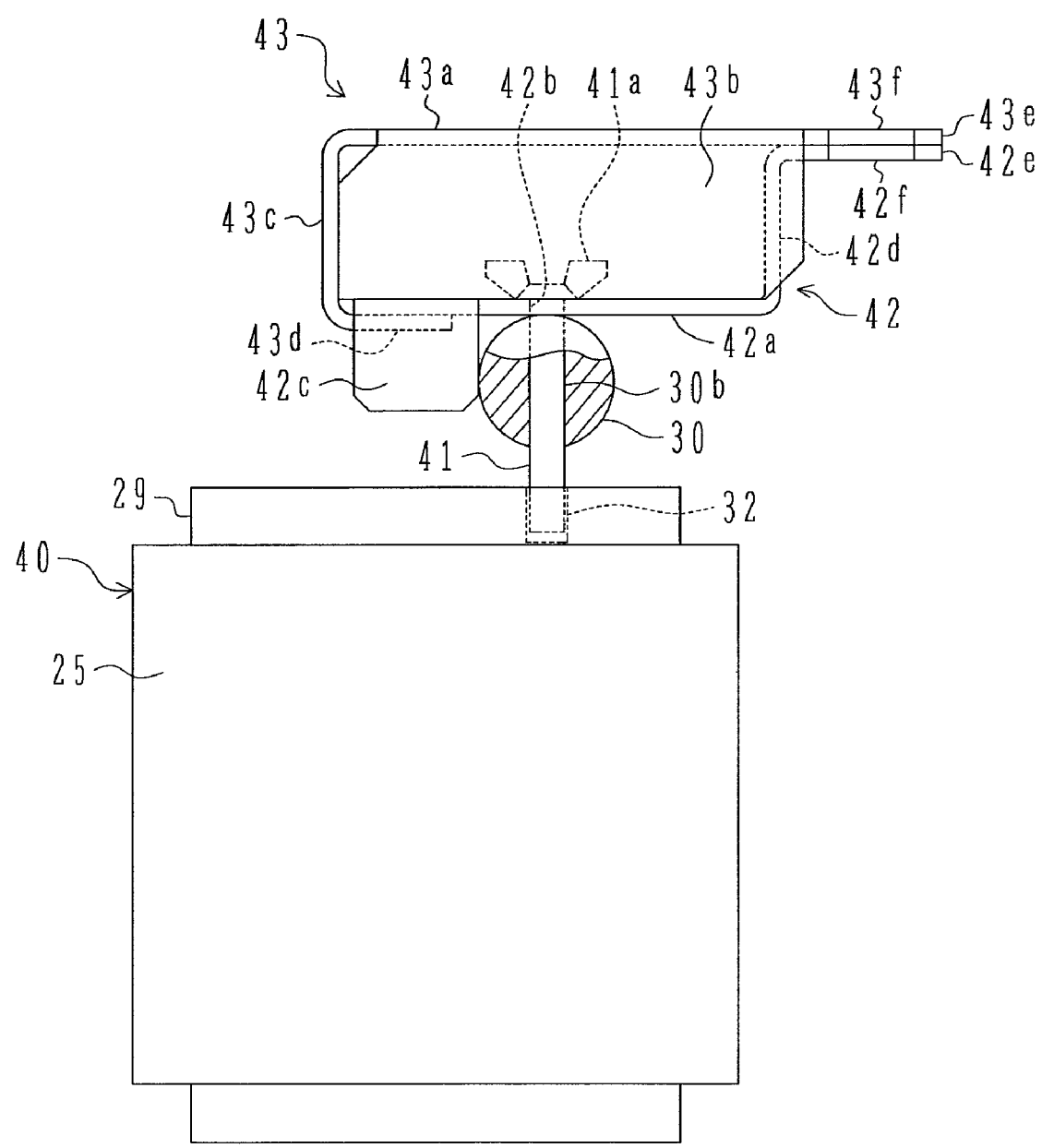
FIG. 11 is a lateral view of the operation pattern selecting valve to which a second embodiment of a lock device of the present invention is applied.
Figure 16:
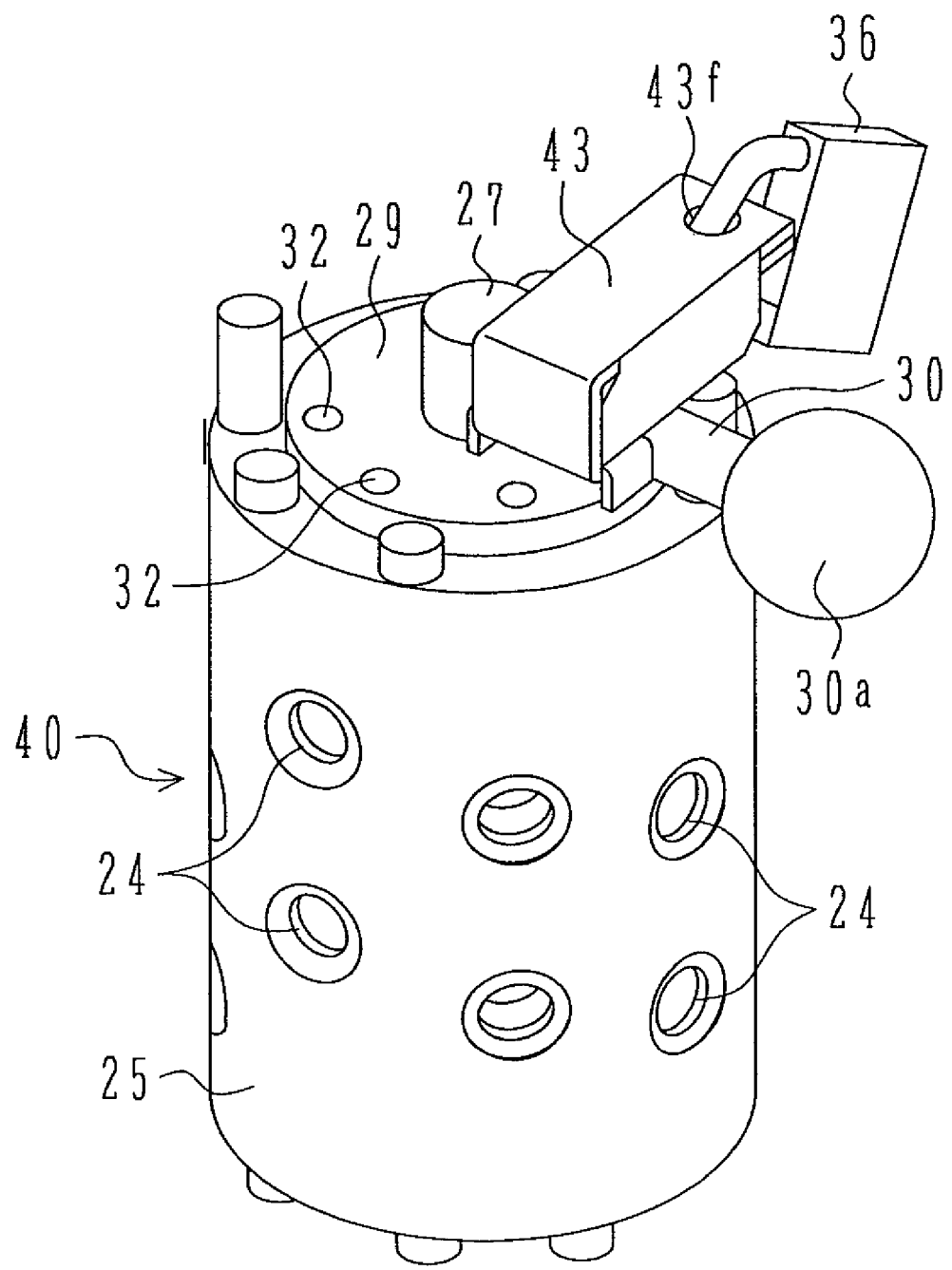
FIG. 16 is a perspective view illustrating a state where locking is performed additionally to the state shown in FIG. 15 in the second embodiment.

Referring to FIG. 11, a lock device of this embodiment is configured such that a head (operating portion) 41a of the screw element 41 is covered by a second bracket 43 joined to a first bracket 42, and the first and second brackets 42, 43 are made non-separable by a lock 36 (see FIG. 16). In short, the lock device is configured such that the head 41a of the screw element 41 is covered so as not to be turned, thereby making it impossible to remove the screw element 41 from the control lever 30.

Figure 12A:
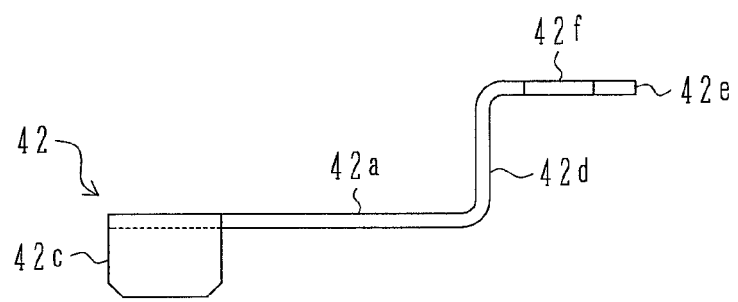
FIG. 12A is a lateral view of a first bracket constituting the lock device of FIG. 11.
Figure 12B:
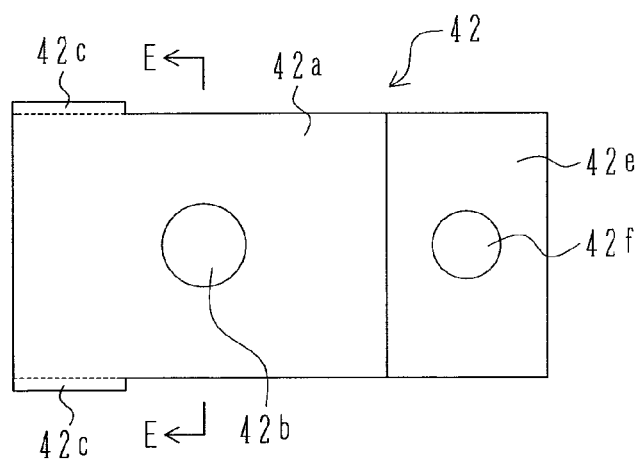
FIG. 12B is a plan view of FIG. 12A.
Figure 12C:
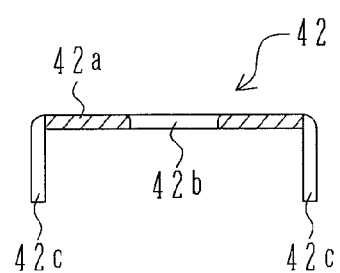
FIG. 12C is a cross-sectional view taken along line E-E of FIG. 12B.
Figure 13A:
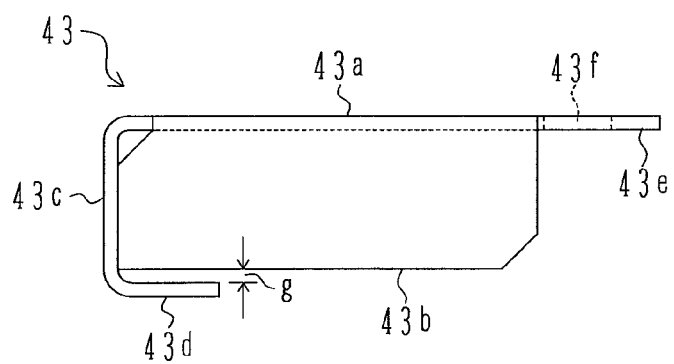
FIG. 13A is a lateral view of a second bracket constituting part of the lock device of FIG. 11.
Figure 13B:
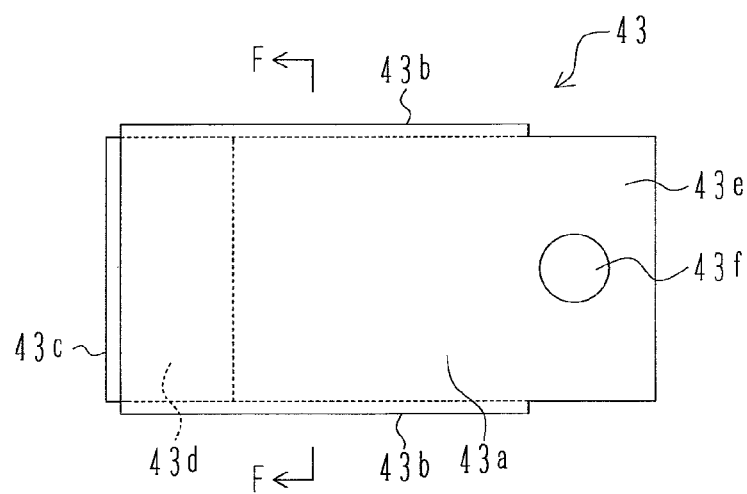
FIG. 13B is a plan view of FIG. 13A.
Figure 13C:
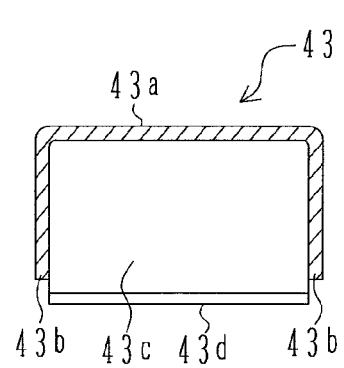
FIG. 13C is a cross-sectional view taken along line F-F of FIG. 13B.

FIGS. 12A, 12B and 12C illustrate the structure of the first bracket 42 and FIGS. 13A, 13B and 13C illustrate the structure of the second bracket 43. The first bracket 42 shown in FIG. 12 is secured to the turn-type control lever 30 by the screw element 41. The first bracket 42 includes a flat plate portion 42a abutted against the control lever 30 and formed with an attachment hole 42b adapted to receive the screw element 41 inserted thereinto. The first bracket 42 includes locking pieces 42c provided on both sides of the flat plate portion 42a on one end side thereof and abutted against the lateral surfaces of the control lever 30 for locking. In addition, the first bracket 42 includes a rise portion 42d extending from the other end of the flat plate portion 42a and a joint piece 42e formed to extend from the rise portion 42d and formed with a lock hole 42f.

On the other hand, the second bracket 43 shown in FIG. 13 includes a flat plate portion 43a, lateral plate portions 43b formed on left and right sides of the flat plate portion 43a, a longitudinal plate portion formed on one end of the flat plate portion 43a and an uplift prevention piece 43d extending from the longitudinal plate portion 43c and also serving as a locking piece. The uplift prevention piece 43d and the bottom sides of the lateral plate portions 43b defines a gap g therebetween equal to or slightly larger than the thickness of the flat plate portion 42a included in the first bracket 42. In addition, the second bracket 43 includes a joint piece 43e formed to extend from the other end of the flat plate portion 43a and formed with a lock hole 43f.

Figure 14:
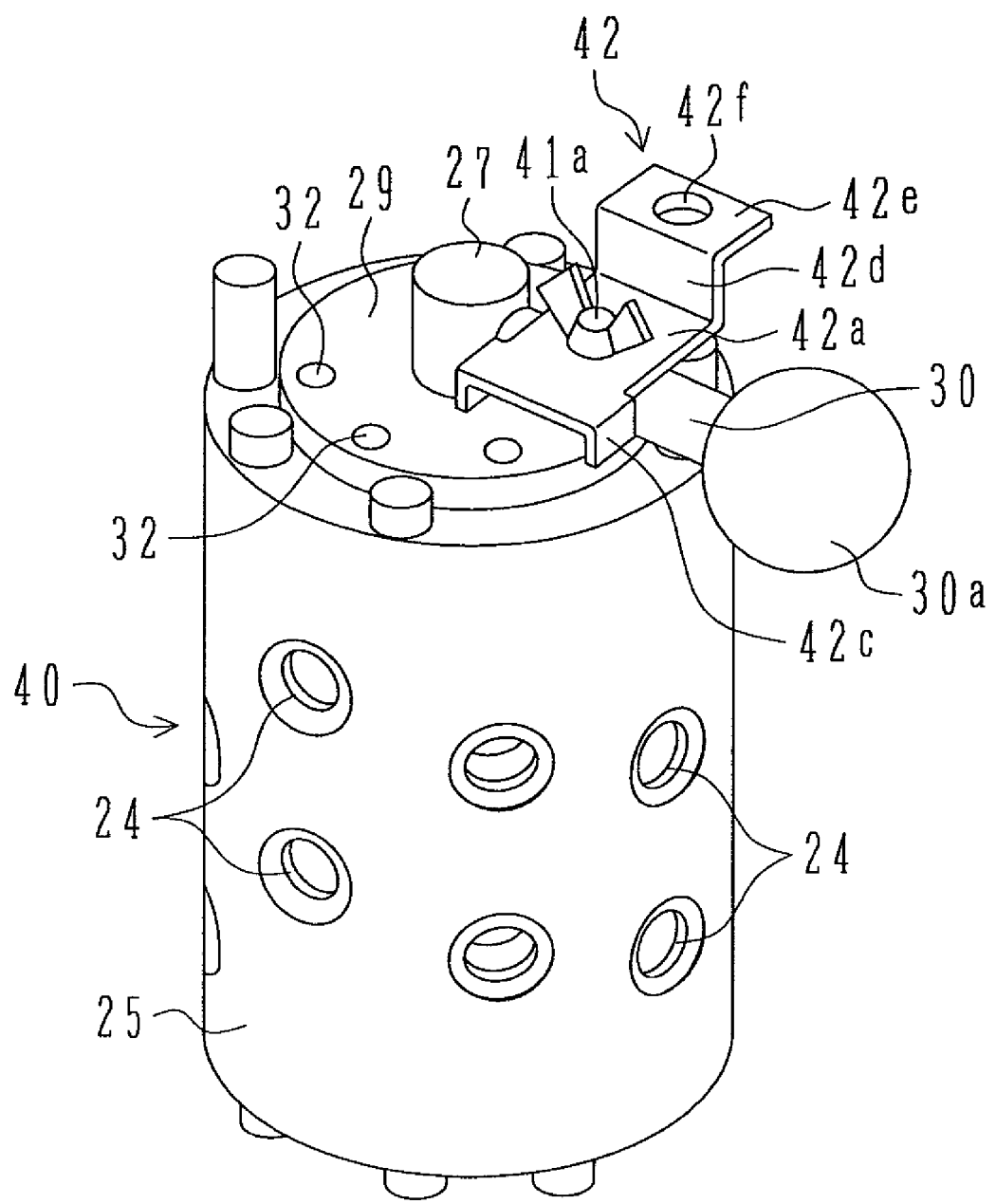
FIG. 14 is a perspective view illustrating a state where the first bracket is attached to the turn-type control lever of the operation pattern selecting valve in the second embodiment.
Figure 15:
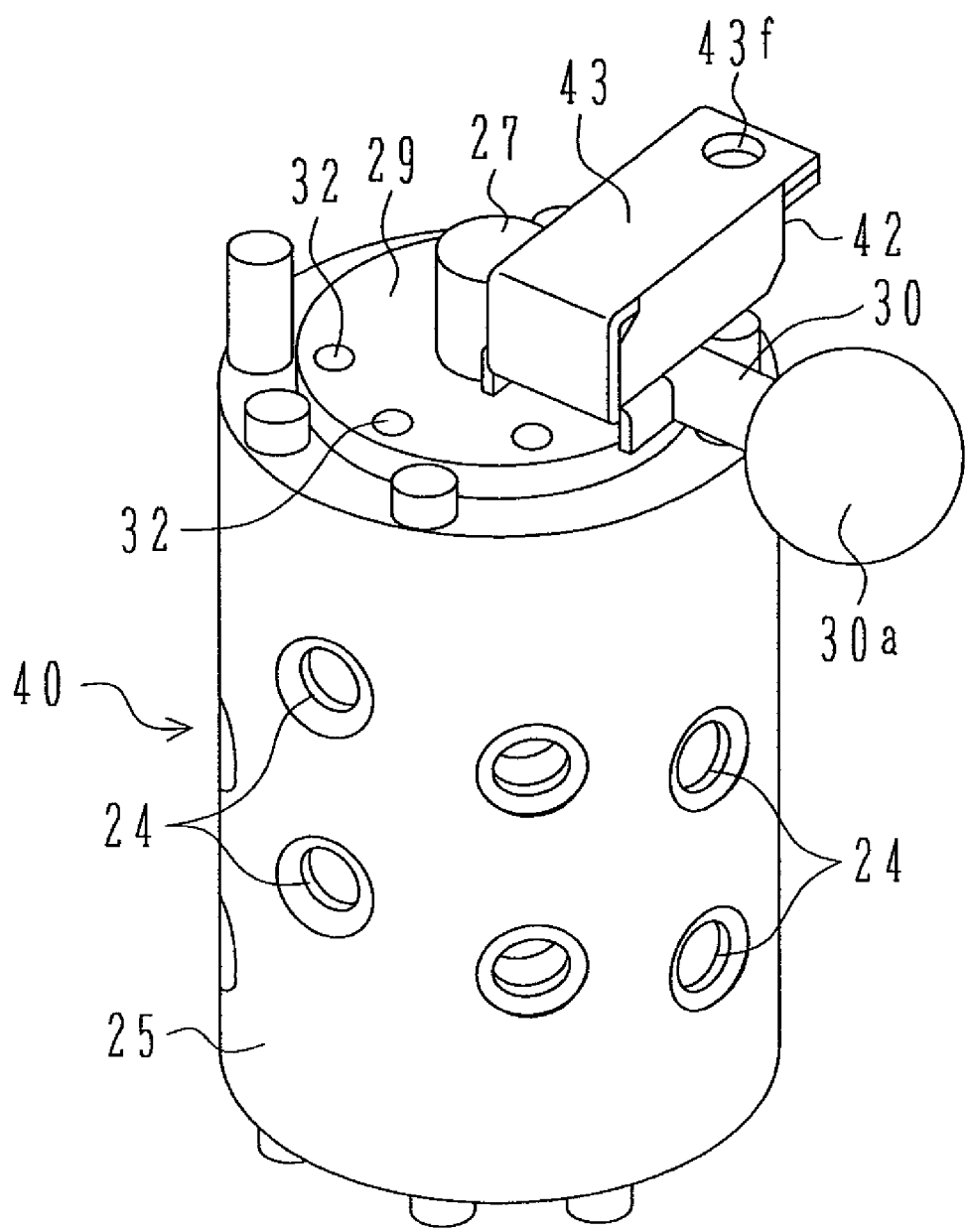
FIG. 15 is a perspective view illustrating a state where the second bracket is further assembled with the first bracket additionally to the state of FIG. 14 in the second embodiment.

FIGS. 14 to 16 illustrate a process for locking the turn-type control lever 30 using the brackets 42, 43 of the second embodiment. Referring to FIG. 14, the turn-type control lever 30 is set at a certain position, then, the first bracket 42 is put on the control lever 30, the screw element 41 is inserted into the attachment hole 42b of the first bracket 42 and into the hole 30b of the control lever 30, and screwed into the threaded hole 32 immediately below the control lever 30 for securing the first bracket 42 to the control lever 30. In other words, the first bracket 42 is sandwiched between the head 41a of the screw element 41 and the control lever 30, and the locking piece 42c is abutted against the lateral surfaces of the control lever 30 for locking and fixation.

Referring to FIGS. 11 and 15, next, the second bracket 43 is prevented from lifting by sandwiching the flat plate portion 42a of the first bracket 42 between the lateral plate portions 43b of the second bracket 43 and uplift prevention piece 43d. The uplift prevention piece 43d is inserted between the left and right locking pieces 42c of the first bracket 42 and the rise portion 42d of the first bracket 42 is sandwiched between the lateral plate portions 43b of the second bracket 43 for locking. The flat plate portion 42a of the first bracket 42 is fitted into the deep portion of the gap g between the uplift prevention piece 43d and lateral plate portions 43b of the second bracket 42. Thus, the respective joint pieces 42e, 43e of the first and second brackets 42, 43 are overlapped with each other and the lock holes 42f, 43f are aligned with each other. In this way, the first and second brackets 42, 43 are assembled with each other and, thereafter as shown in FIG. 16, the lock 36 is inserted into the lock holes 42f, 43f for locking.

In the second embodiment, the head 41a of the screw element 41 for the control lever 30 is surrounded by the first and second brackets 42, 43 so that the screw element 41 cannot be removed unless the lock 36 is unlocked. Therefore, the operation pattern is unlikely to be changed by someone. In the present embodiment, the hole 30b formed in the control lever 30 is used to secure the first bracket 42 with the screw element 41 inserted into the hole 30b and the second bracket 43 is assembled with the first bracket 42 for locking with the lock 36. Thus, the operation pattern selecting valve 40 does not need operation such as welding of the bracket and drilling, thereby facilitating the manufacture.

In the embodiments described above, while the brackets 34, 35, 42, and 43 are made of metal, they may be made of plastic. In this case, the bracket 34 may be formed integrally with the screw element 33.

What is claimed is:

1. A lock device for an operation pattern selecting valve in a working machine including:

a plurality of hydraulic actuators for actuating a multi-joint front of the working machine and a swing device for swinging an upper swing structure;

a plurality of hydraulically operated control valves for controlling said hydraulic actuators, and pilot valves for operating the control valves;

tilt-type control levers installed on the left and right of an operator's seat and each serving as a control lever for the pilot valves, each of the tilt-type control lever being tilted forward, rearward, leftward and rightward; and an operation pattern selecting valve interposed in lines between operating hydraulic fluid chambers of each of the hydraulically operated control valves and the pilot valves for supplying pilot hydraulic fluid to the associated operating hydraulic fluid chambers, for selecting the hydraulic actuators actuated by each of the tilt-type control levers and/or selecting an operating direction of each of the hydraulic actuators for the operating direction of each of the tilt-type control levers, the operation pattern selecting valve being configured such that an end plate is attached to an end face of a cylindrical body in which a turn-type spool is housed and a turn-type control lever is attached to a shaft of the turn-type spool so as to project from the end plate in a radial direction of the shaft;

the lock device comprising:

a screw element screwed into a threaded hole formed in the end plate;

a first bracket fixed to said screw element or formed integrally therewith, said first bracket being formed with a first lock hole;

a second bracket having a fitting portion fitted to the turn-type control lever, said second bracket being formed with a second lock hole; and a lock;

wherein the fitting portion of the second bracket is formed with an attachment hole through which a body shaft of said turn-type control lever is inserted axially, and the screw element is screwed into the threaded hole of the end plate adjacent said turn-type control lever to secure said first bracket to the end plate, the fitting portion of said second bracket is fitted to the turn-type control lever by inserting the body shaft of the turn-type control lever axially into said attachment hole formed in the fitting portion of the second bracket to connect said second bracket to the turn-type control lever, and said lock is insertably attached to the first and second lock holes of said first and second brackets for locking the turn-type control lever.

2. The lock device for an operation pattern selecting valve according to claim 1, wherein said second bracket has a stopper which abuts against a tip of the body shaft of the turn-type control lever thereby to prevent the turn-type control lever from dropping out of the shaft of the turn-type spool.

3. A lock device for an operation pattern selecting valve in a working machine including:

a plurality of hydraulic actuators for actuating a multi-joint front of the working machine and a swing device for swinging an upper swing structure;

a plurality of hydraulically operated control valves for controlling said hydraulic actuators, and pilot valves for operating the control valves;

tilt-type control levers installed on the left and right of an operator's seat and each serving as a control lever for the pilot valves, each of the tilt-type control lever being tilted forward, rearward, leftward and rightward; and an operation pattern selecting valve interposed in lines between operating hydraulic fluid chambers of each of the hydraulically operated control valves and the pilot valves for supplying pilot hydraulic fluid to the associated operating hydraulic fluid chambers, for selecting the hydraulic actuators actuated by each of the tilt-type control levers and/or selecting an operating direction of each of the hydraulic actuators for the operating direction of each of the tilt-type control levers, the operation pattern selecting valve being configured such that an end plate is attached to an end face of a cylindrical body in which a turn-type spool is housed and a turn-type control lever is attached to a shaft of the turn-type spool so as to project from the end plate in a radial direction of the shaft;

the lock device comprising:

a screw element for securing the turn-type control lever, said screw element having a shank portion and a head as an operating portion;

a first bracket having a first flat plate portion and formed with an attachment hole in the first flat plate portion and a first lock hole;

a second bracket having a structure to be assembled with said first bracket and having a second flat plate portion and lateral plate portions formed on opposing sides of the second flat plate portion and formed with a second lock hole; and a lock;

wherein the shank portion of said screw element is inserted into the attachment hole of said first bracket and a hole formed in a body shaft of the turn-type control lever and screwed into a threaded hole formed in the end plate thereby to secure said first bracket to the turn-type control lever by sandwiching the first flat plate portion of the first bracket between the head of the screw element and the turn-type control lever, and said second bracket is assembled with said first bracket to surround the head of said screw element by said first bracket and the second flat plate portion and the lateral plate portions of the second bracket thereby to cover the head of said screw element by said second bracket and the first lock hole of said first bracket is aligned with the second lock hole of said second bracket and said lock is insertably attached to the first and second lock holes for locking the turn-type control lever.

* * * * *